United States Patent
Liu et al.

(10) Patent No.: US 11,416,989 B2
(45) Date of Patent: Aug. 16, 2022

(54) DRUG ANOMALY DETECTION

(71) Applicant: Precise Software Solutions, Inc., Rockville, MD (US)

(72) Inventors: Xin Liu, Rockville, MD (US); Ruomin Ba, Rockville, MD (US); James Wang, Rockville, MD (US); Bin Duan, Rockville, MD (US); Xu Yang, Rockville, MD (US); Hang Wang, Rockville, MD (US)

(73) Assignee: PRECISE SOFTWARE SOLUTIONS, INC., Rockville, MD (US)

( * ) Notice: Subject to any disclaimer, the term of this patent is extended or adjusted under 35 U.S.C. 154(b) by 161 days.

(21) Appl. No.: 16/943,604

(22) Filed: Jul. 30, 2020

(65) Prior Publication Data

US 2021/0035288 A1     Feb. 4, 2021

Related U.S. Application Data (60) Provisional application No. 62/880,788, filed on Jul. 31, 2019.

(51) Int. Cl.
| | |
|---|---|
| *G06T 7/00* | (2017.01) |
| *G06N 20/00* | (2019.01) |
| *G01N 21/359* | (2014.01) |
| *G06V 10/10* | (2022.01) |

(52) U.S. Cl.
CPC ......... *G06T 7/0012* (2013.01); *G01N 21/359* (2013.01); *G06N 20/00* (2019.01); *G06V 10/17* (2022.01); *G06T 2207/10048* (2013.01); *G06T 2207/30004* (2013.01)

(58) Field of Classification Search
CPC ......... G06T 7/0012; G06T 2207/10048; G06T 2207/30004; G06N 20/00; G06V 10/17; G01N 21/359
See application file for complete search history.

(56) References Cited

U.S. PATENT DOCUMENTS

| | | | |
|---|---|---|---|
| 10,007,920 B2 * | 6/2018 | Ranieri | G16H 20/10 |
| 2016/0004927 A1 * | 1/2016 | Yonaha | G06T 7/33 382/201 |
| 2017/0147787 A1 * | 5/2017 | Albrecht | G16H 20/10 |
| 2019/0205716 A1 * | 7/2019 | Moshkovitz | G06K 19/07354 |

FOREIGN PATENT DOCUMENTS

| | | | | |
|---|---|---|---|---|
| EP | 2414810 B1 * | 9/2020 | | G01J 3/02 |

* cited by examiner

*Primary Examiner* — Khai M Nguyen
(74) *Attorney, Agent, or Firm* — Hamre, Schumann, Mueller & Larson, P.C.

(57) ABSTRACT

A portable anomaly drug detection device is disclosed. The device includes at least one light source, a detector to scan or process the subject drug, and a control circuit having a controller. The at least one light source, the camera, and the control circuit are disposed within an enclosure. The controller is configured to process and analyze drug images captured by the camera when the light source emits light, and determines whether a drug is counterfeit upon detection of an anomaly within the captured images relative to a trained counterfeit detecting machine-learning model.

20 Claims, 6 Drawing Sheets

DRUG ANOMALY DETECTION

CROSS-REFERENCE TO RELATED APPLICATIONS

Priority is claimed from U.S. Provisional Application No. 62/880,788 filed on 31 Jul. 2019, entitled "Counterfeit Drug Detection," the entire disclosure of which is hereby incorporated by reference.

TECHNICAL FIELD

The technologies described herein pertain generally to detecting anomalies in drugs or drug samples. The technologies may be used in, e.g., post-market drug and biological product safety testing, drug market surveillance, law enforcement, etc.

BACKGROUND

According to the Center for Medicine in the Public Interest in the United States of America, worldwide sales of counterfeit prescription medicines exceeded US$75 billion. Some studies show that 8% to 15% of all over-the-counter (OTC) and prescription medicines in the U.S. are counterfeit. As many as 19 million Americas may buy drugs from foreign online pharmacies and other unlicensed sources annually, and approximately 275 million medicine packages come through U.S. Postal Service and other U.S.-based courier facilities annually, yet only about 0.06% of these packages are inspected. Low cost, reliable, and quick methods that can detect anomalies as an indication of counterfeit medicines are long-felt but unsolved need.

SUMMARY

In accordance with at least one embodiment described and recited herein, a portable drug anomaly detection device includes a receptacle; at least one light source to emit light of a predetermined wavelength; a detector to capture digital signal corresponding to a drug in the drug receptacle; and a control circuit that processes the captured digital signal in accordance with a trained machine-learning model and identifies an anomaly corresponding to the object in the receptacle, in accordance with the trained machine-learning model. The receptacle, the at least one light source, the detector, and the control circuit are configured within the device. A digital signal, as disclosed and recited herein, may be regarded as a signal that is used to represent the drug as a sequence of discrete values; at any given time, it may take on one of a finite number of values.

In accordance with at least one other embodiment described and recited herein, a non-transitory computer-readable medium stores executable instructions that, when executed by a processor, cause the processor to perform operations to identify an anomaly corresponding to a drug, the operations including: exposing at least a sampling of the drug to a light emitted from at least one light source; capturing at least one digital signal corresponding to the sampling of the drug when exposed to the light emitted from the at least one light source; applying a machine-learned model to the captured digital image of the sampling of the drug; and determining whether the captured digital image includes an indication of anomaly relative to a standard for the drug based on the machine-learned model applied to the captured digital image.

In accordance with at least one other embodiment described and recited herein, a system comprises a drug verification device that, itself, comprises: a sampling holder; a light source to emit light of a predetermined wavelength; a detector to capture digital signal corresponding to a drug sampling in the sampling holder; a control circuit that identifies an anomaly corresponding to the drug sampling in the sampling holder, in accordance with a trained machine-learning model; and a portable device, communicatively connected to the drug verification device via a near-field communication protocol. The portable device is configured to transmit the trained machine-learning model to the drug verification device and receive an indicator that an anomaly has been detected in connection with the drug sampling in the sampling holder.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive embodiments are described with reference to the following drawings. The components in the figures are not necessarily to scale, emphasis instead being placed upon illustrating principles.

The present disclosure provides a detailed and specific description that refers to the accompanying drawings. The drawings and specific descriptions of the drawings, as well as any specific or alternative embodiments discussed, are intended to be read in conjunction with the entirety of this disclosure. The portable anomaly detection device and system may, however, be embodied in many different forms and should not be construed as being limited to the embodiments set forth herein; rather, these embodiments are provided by way of illustration only and so that this disclosure will be thorough, complete and fully convey understanding to those skilled in the art.

References are made to the accompanying drawings that form a part of this disclosure and which illustrate embodiments in which the systems and methods described in this specification may be practiced.

DETAILED DESCRIPTION

Non-limiting example embodiments pertaining to anomaly drug detection will be discussed below in further detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

As used herein and in the claims, the singular forms "a", "an" and "the" include plural references unless the context clearly dictates otherwise.

In the following detailed description, reference is made to the accompanying drawings, which form a part of the description. Furthermore, unless otherwise noted, the description of each successive drawing may reference features from one or more of the previous drawings to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Embodiments disclosed and recited herein provide an extendible machine-learning (or artificial intelligence, "AI") based drug anomaly detecting device and system that may quickly and reliably determine whether a drug sample is anomalous in any manner of composition and is therefore not legitimate, counterfeit, or otherwise deficient, in an automated manner. Legitimacy of a drug or drug sampling may be assessed relative to a composition approved by a governmental regulating authority, e.g., Food and Drug Administration (FDA); and deficiency of a drug may also be assessed with regard to a composition of the drug or drug sampling, that is standardized or approved by a manufacturer of the drug.

Further, as referenced herein, a drug or drug sampling subjected to inspection or scrutiny implemented by any of the apparatuses, devices, systems, methods, and/or programs described and/or recited herein may be inspected or scrutinized in the form of a tablet or pill, or portion thereof, powder, granules, droplet or other volume of liquid. Thus, unless context dictates otherwise, reference will be made hereafter to a "drug" when referring to the inspection or scrutiny thereof, and it should be understood that the form or portion thereof encompasses any of a tablet or pill, or portion thereof, powder, granules, droplet or other volume of liquid.

Use of the device and system requires no special training and produces minimal environmental impact. Embodiments disclosed herein provide a self-contained, integrated solution that provides an automated and efficient way of detecting an anomaly or deficiency in a drug by leveraging advanced Machine Learning (ML) technologies.

Spectroscopy such as Raman spectroscopy, Fourier transform infrared spectroscopy (FTIR), and Near Infrared spectroscopy (NIR) may be effective in detecting one or more anomalies in a drug, in accordance with the embodiments described and recited herein. Using a combination of different spectroscopic techniques, e.g., using a Raman spectrometer in combination with an infrared (IR) spectrometer for pharmaceutical tablets or pills having relatively low quantities of active pharmaceutical ingredients may improve the accuracy by which one or more anomalies in a drug are detected. Further, combining a spectroscopic tool with a visual inspection tool may enhance verification of results rather than adding results from each individual tool. The solutions described, recited, and contemplated herein leverage a combination of multiple wavelength lights to detect one or more anomalies based on differences between a subject drug under a multi-wavelength light, relative to an authentic composition thereof as provided by a utilized ML technology.

Drugs having different compositions may produce different reflection rates in response to exposure to lights of varying frequency. As a non-limiting example, by exposing a drug to ultraviolet light (UV, wavelength at or about 380 nm), visible light (VIS, wavelength at or about 430 nm to at or about 770 nm), or IR light (wavelength at or about 940 nm), and capturing an image of the drug as exposed to the light using a camera and/or capturing digital signal reflected from the drug using a spectrometer, various machine learning methodologies may be utilized to detect a one or more anomalies corresponding to a drug.

As described and/or recited herein, "machine learning" may refer to an artificial intelligence (AI) application that provides systems the ability to automatically learn and improve from experience without being explicitly programmed. Machine learning focuses on the development of computer programs that may access data and use the accessed data to learn for themselves. Machine learning algorithms build a trained machine-learning model, e.g., a trained anomaly detecting machine learning model, a mathematical model, etc., based on sample data, e.g., images of a drug, signals deflected from a drug, or other forms of data from the selected detection method etc., known as "training data", in order to make predictions or decisions without being explicitly programmed to do so.

At least one embodiment of a drug anomaly detection machine learning system described and recited herein may include a combination of Convolutional Neural Network (CNN) and/or a one-class classification or other machine learning algorithms. The machine learning model(s) (the CNN model and/or the one-class classification model) is trained or enhanced before being deployed. In at least one example embodiment, anomalous drug samples are not utilized to initialize the anomaly drug detection AI system or to train the one-class classification model. In at least one example embodiment, anomalous drug samples are utilized to train the CNN model. By leveraging embedded AI accelerator application-specific integrated circuit (ASIC) hardware, neural network algorithms may be implemented with real-time performance on the resource-limited hardware.

It will be appreciated that "augmentation" or "image augmentation" may refer to a technique that is used to artificially expand the data set of, e.g., digital signals, images, etc. Augmentation is a machine learning process for a limited data set to prevent the machine-learning model from over-fitting when the model is trained on a limited number of data samples. Over-fitting refers to a model that trains data to the extent that the model learns the detail and noise in the training data such that it negatively affects the accuracy of the model on new data. Augmentation may increase the data sample count with attributes such as zooming, shearing, rotating, preprocessing, etc., to generate images having these attributes when training a machine learning (e.g., deep learning) model. Image samples generated using image augmentation, may increase an existing data sample set.

It will further be appreciated that "edge" computing refers to a distributed computing paradigm that brings computation and data storage closer to the location where it is needed, to improve response times and to save bandwidth.

Drugs having different components, e.g., size, shape, color, surface, imprint differences, different chemical compositions, etc., and may have different reflection rates in response to being exposed to certain light frequencies. Therefore, drugs having one or more anomalies may display different image features or reflect digital signals indicative of an anomaly compared to their respective authentic or standard drug counterparts under one or more light frequencies. Accordingly, embodiments of a drug anomaly detection system described and recited herein may deploy multiple lights with different wavelengths, ranging from ultraviolet (at or about 380 nm wavelength) to infrared (at or about 940 nm wavelength; including near infrared) to detect drugs having at least one anomaly.

In accordance with at least one embodiment, a detector, which may be implemented as a full-spectrum high definition camera or spectrometer, may be utilized to capture images or digital signals corresponding to a subject drug under different lights of varying frequency/wavelength, with a processing board of the detector including an ASIC. A "full-spectrum" camera may refer to a camera that may capture more light than a normal camera that, for example, may capture visible light images only, while a full-spectrum camera may further capture infrared light images, ultraviolet light images, and visible light images. The ASIC may execute programmed/deployed/trained anomaly detecting machine learning models to process and analyze drug images locally on the devices, thus avoiding a need to upload and process models and images to a cloud-based device. Accordingly, the embodiments described, recited, and even contemplated herein produce substantially real-time performance, without requiring network connectivity, to thereby provide viable solutions in remote areas where counterfeiting may be rampant or under other circumstances in which a network connection is not immediately accessible or testing for drug authenticity or legitimacy is expected or needed in real-time.

The aforementioned machine learning models may be based on authentic drug images captured by a full-spectrum camera under different lights (VIS, UV, IR, near IR, etc.) or based on digital signals reflected from standard or authenticated samples of a drug, resulting in at least one convolutional neural network (CNN) model or an one-class classification model corresponding to a respective drug. To improve model performance, comprehensive image processing and augmentation techniques may be utilized to generate comprehensive sets of images of authentic drugs as training sets. Models that have attained satisfactory levels of accuracy and robustness may then be deployed to the ASIC on the device.

Figure 1:
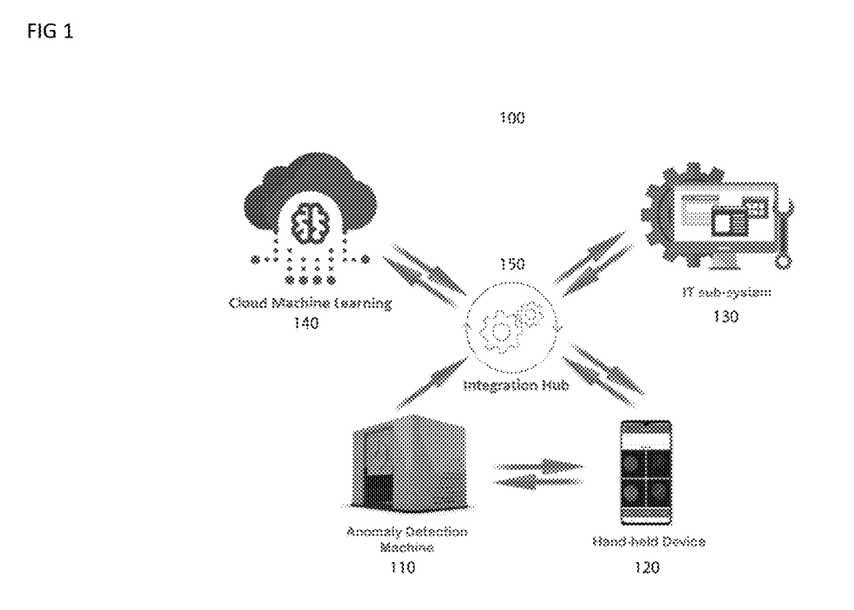
FIG. 1 is a schematic diagram of a drug anomaly detection system, according to at least one example embodiment described and recited herein.

FIG. 1 is a schematic diagram of an anomaly drug detection system 100, according to at least one example embodiment described and recited herein. The system 100 may include an anomaly drug detection device 110, a hand-held device 120, an information technology (IT) sub-system 130, a cloud machine-learning module 140, and an integration hub 150 that serves as a connection among 110, 120, 130, and 140. In at least one example embodiment, the device 110 may be implemented as a portable device, i.e., powered by a battery. The mobile device 110, as well as hand-held device 120 may be implemented as a small-form factor portable (or mobile) electronic device such as a cell phone, a tablet, a personal data assistant (PDA), a personal media player device, a wireless web-watch device, a personal headset device, an application specific device, or a hybrid device that include any of the above functions. The IT sub-system 130 may be implemented as a personal computer including either laptop computer or non-laptop computer configurations. The cloud machine-learning module 140 may be implemented as a drug anomaly detection machine leaning module that may be deployed and executed in the cloud.

In operation, the drug anomaly detection device 110 may output captured images and/or digital signals, as well as the detection results, to the hand-held device 120 to inform a user of the results in the form of, e.g., display, audible notification, or haptic notification. In accordance with at least some embodiments, the hand-held device 120 may deploy, via a radio frequency (e.g., Bluetooth) connection, a trained anomaly detecting model to the drug anomaly detection device 110 for use. The hand-held device 120 may configure and control the drug anomaly detection device 110 via e.g., user commands. The anomaly detection device 110 may upload the captured drug images and/or captured digital images, as well as the detection results to the IT sub-system 130 and/or the cloud machine-learning module 140 for processing, storing, or displaying, via the integration hub 150. The IT sub-system 130 and/or the cloud machine-learning module 140 may train an anomaly detecting model, and the hand-held device 120 may download/deploy the trained anomaly detecting model from the IT sub-system 130 and/or the cloud machine-learning module 140, via the integration hub 150, to the drug anomaly detection device 110. The hand-held device 120 may upload the captured drug images and/or digital signals, as well as the detection results from the drug anomaly detection device 110 to the IT sub-system 130 and/or the cloud machine-learning module 140 for processing, storing, or displaying, via the integration hub 150.

The drug anomaly detection device 110 may include a power switch (not shown) to power on/off the device 110. The device 110 may also include a user interface (not shown) to facilitate, e.g., pairing of the device 110 to the hand-held device 120 via a near-field communication protocol, e.g., Bluetooth connection, start the detecting process. Alternatively, the hand-held device 120 may initiate the detecting process.

In accordance with at least one non-limiting embodiment, hand-held device 120 may be a bridge between the device 110 and a backend application in the IT subsystem 130 or in the cloud 140. The hand-held device 120 has multiple functions, including start detection on the device 110. Control of the device 110 may be implemented by an application having the aforementioned graphic user interface GUI on the hand-held device 120. When the hand-held device 120 is communicatively connected to the device 110, user command(s) may be transmitted from the hand-held device 120 to the device 110 to capture one or more images and/or digital signals corresponding to a subject drug, in order for a determination regarding the presence of one or more anomalies corresponding to the drug, and then transmit a result of the determination to one or more users. For example, when training the model using a set of training images and/or digital images corresponding to a standard composition of a subject drug, the images and/or digital signals may be captured in the device 110 and then transmitted to the hand-held device 120, which may bridge/relay the images to the cloud 140 for the backend training process. After being trained in the backend (e.g., cloud 140 or IT subsystem 130), the trained module may be downloaded to the hand-held device 120 for deployment to the device 110.

Figure 2:
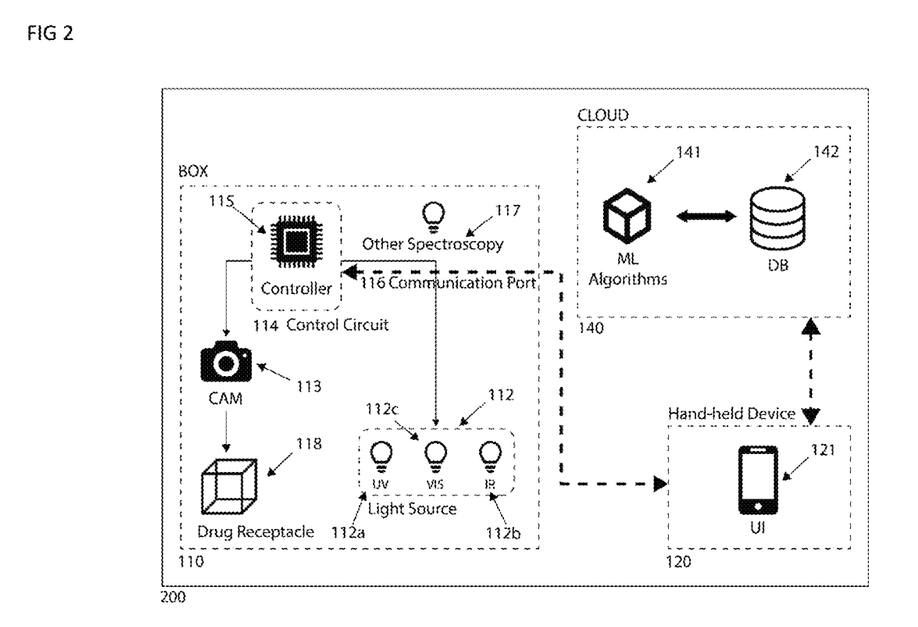
FIG. 2 is a schematic diagram of an anomaly drug detection system, according to at least one other example embodiment described and recited herein.

FIG. 2 is a schematic diagram of a drug anomaly detection system 200, according to at least one other example embodiment described herein. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. The system 200 includes drug anomaly detection device 110, hand-held device 120, and cloud machine-learning module 140. In at least one example embodiment, the drug anomaly detection device 110 includes an enclosure (device chamber) 111, at least one light source 112, a camera 113 separate from the at least one light source 112, and a control circuit 114. The drug receptacle, the at least one light source 112, the camera 113, and the control circuit 114 are disposed within the enclosure 111. The light source 112 includes at least one ultraviolet light source 112A, at least one infrared light source 1123, at least one visible light source 112C, and at least one other spectroscope 117. The camera 113 may be implemented as a full spectrum camera to capture infrared light images, ultraviolet light images, and visible light images. The control circuit 114 may be implemented as an ASIC to execute anomaly detecting machine learning models locally within the counterfeit drug detection device 110. The controller may communicatively control the at least one light source 112 and the camera 113. The hand-held device 120 includes a user interface (e.g., GUI) or display 121. The cloud machine-learning module 140 includes the machine learning algorithms 141, which includes an automated end-to-end process of applying machine learning to real-word problems. The cloud machine-learning module 140 also includes a data repository (e.g., a database) 142. The hand-held device 120 and the cloud machine-learning module 140 communicate with the controller 115 of the control circuit 114, via a communication port (e.g., general purpose input output (GPIO), wireless or wire port, etc.) of the control circuit 114.

Drugs to be tested may be placed on or in the drug receptacle (see e.g., 118 in FIG. 2), which may be tailored to hold at least a sampling of a drug in the form of a tablet or pill, or portion thereof, powder, granules, droplet or other volume of liquid, inside the enclosure 111. Multiple pictures/images and/or digital signals corresponding to the subject drug may be captured by the detector 113 under different wavelength lights emitted by the at least one light source 112 and processed by the corresponding controller 115 of the control circuit 114 "OR" logic may be implemented for the actual detection of a drug with an anomaly. That is, if one or more of the captured images of the drug, or captured digital signals reflected from the drug, under one (or more than one) wavelength reveals one or more anomalies, the device produces an indication that the subject drug is anomalous, which may be an indication of the drug being a counterfeit, deficient in its composition, or in some manner illegitimate. As referenced herein, an "anomaly" may refer to a mismatch between the captured image of a subject drug or a disparity in captured digital signals reflected from the drug, relative to the trained machine-learning model.

When detector 113 is implemented as a camera, a mismatch may refer to a difference between a captured image of a subject drug and an image of an authentic, legitimate, and/or standard drug perceived by a trained machine learning model, e.g., trained using images of an authentic, legitimate, and/or standard drug, and a detected difference may relate to color, shape, size, amount/percentage of an active ingredient, any suitable marks embedded in an authentic drug by the drug manufacturer, or the like. It will be appreciated that regarding the difference, a threshold (e.g., at or about 70% accuracy rate or above, at or about 90% accuracy rate or above, etc.) may be applied when determining whether there is a mismatch between an image of a subject drug image and an image of an authentic or legitimate drug as perceived by a trained machine learning model.

When detector 113 is implemented as a spectrometer, a difference in digital signals between those reflected from the subject drug and those of an authentic, legitimate, and/or standard drug, is determined by a trained machine learning model.

The hand-held device 120 may have an associated mobile application ("app") installed and executed thereon to connect to the drug anomaly detection device 110 via wireless communication (e.g., Bluetooth, etc.), and the app may be utilized to control the drug anomaly detection device 110 and to receive testing results therefrom for alerting the user.

Figure 3:
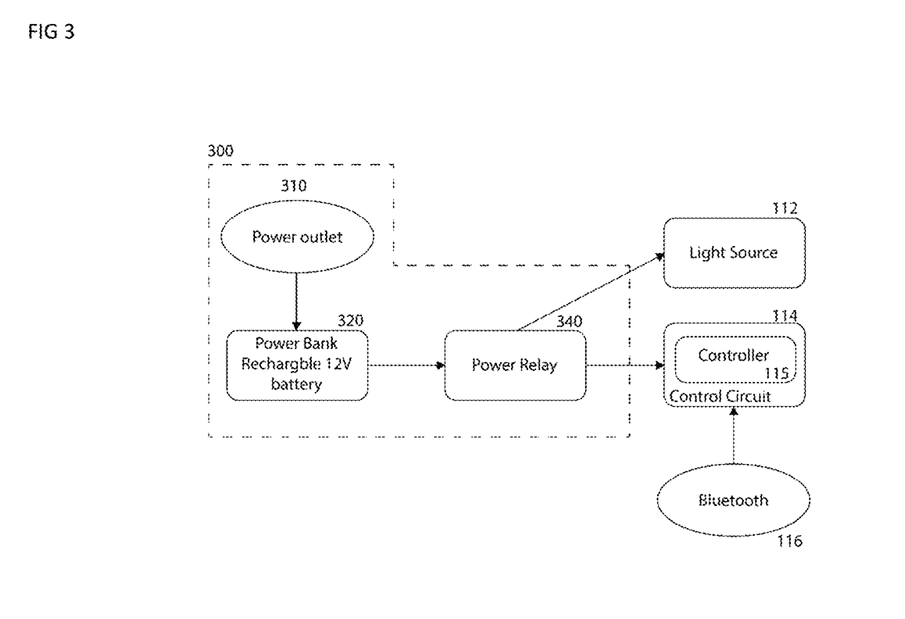
FIG. 3 is a block diagram of a power supply system for an anomaly drug detection device, according to at least one example embodiment described and recited herein.

FIG. 3 is a block diagram of a power supply system 300 of the drug anomaly detection device 110, according to at least one example embodiment described herein. The power supply system 300 includes an optional power outlet 310, a power bank 320, and an optional relay (e.g., a four-module relay) 340. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

In at least one example embodiment, the power outlet 310 may connect the power supply system 300 to an external power source (e.g., utility power, shore power, etc.) so that the external power source may supply power to, or charge, the power bank 320; or to power the relay 340 and the control circuit 114.

The drug anomaly detection device 110 may include a control circuit 114 having a controller 115 that enables machine learning computing capabilities (e.g., the ASIC may provide ML inferencing and may execute ML models in a power efficient manner), a miniature computer (minicomputer, e.g., Raspberry Pi, etc., not shown) having a controller (e.g., application processor(s), which may be independent to the controller 115, or be the controller 115 itself) as a processor and memory/storage, etc. The image cognition, machine-learning module software, etc. may reside on the minicomputer or the control circuit 114. The quantity of features and components described and/or recited herein are not limiting. That is, the embodiments of drug anomaly detection device 110 described and recited herein are not limited by the quantities of, e.g., power supplies.

Further, as described and/or recited herein, "the controller" or "the controller 115" may refer to the any one of the controllers 115 and/or the application processor(s). The miniature computer may be implemented as a low cost, credit card sized computer that may plug into a computer monitor or any suitable display device, and may use a standard keyboard and mouse. GPIO pins may be connected between the controller 115 and the four-module relay 340 and the control circuit 114 of the device 110 may further include power, ground, and data input.

Alternative embodiments of the drug anomaly detection system described, recited, and even contemplated herein may utilize different light sources 112 (112A, 112B, 112C) requiring a power supply with different voltages; thus, the embodiments may utilize the relay 340 to diverge different power supplies toward corresponding light sources 112 within the device 110. As non-limiting examples, IR light sources 112B require e.g., approximately 1.5 volts and UV and visible light sources 112A and 112C require e.g., approximately 3.3 volts. These voltage values are non-limiting.

Figure 4:
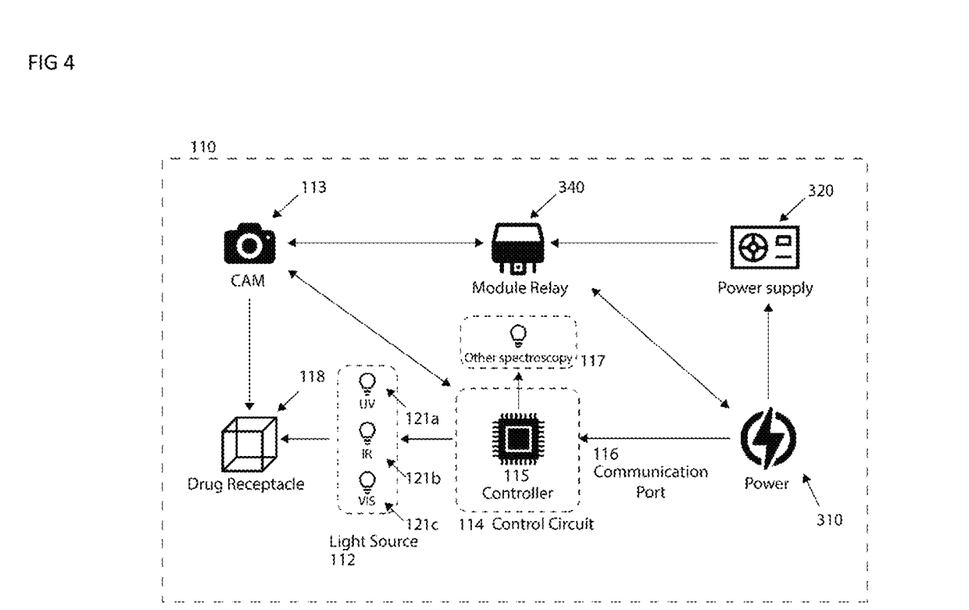
FIG. 4 shows internal components of a anomaly drug detection device, according to at least one example embodiment described and recited herein.

FIG. 4 shows the internal components of the drug anomaly detection device 110, according to at least one non-limiting example embodiment thereof. In accordance with at least one example embodiment, detector 113 may be implemented as, e.g., a USB 2.0 Megapixel High Definition Color Camera UV-VIS-IR (full-spectrum), connected to a USB port of the controller 115. Such cameras may be utilized to record different spectrums of light. A USB camera may be utilized to capture, e.g., three different images under different light spectrums. In accordance with at least one other example embodiment, the detector 117 may be a spectrometer, e.g., near infrared (NIR), also connected to a USB portion of the controller 115, configured to capture digital signals reflected off the subject drug when light from the near-infrared region of the electromagnetic spectrum, e.g., 780 nm to 2500 nm, emanate from, e.g., IR light source 112B.

By at least one example embodiment, three different light sources e.g., UV light source 112A, IR light source 112B, and visible light source 112C may be activated (e.g., start to emit light) by e.g., a user command from the hand-held device 120 in FIG. 2, or by pressing a start button on the drug anomaly detection device 110 to execute the detection algorithm locally. In accordance with at least one embodiment, the light sources 112 may be activated sequentially corresponding to the increasing/decreasing frequency/wavelength.

As illustrated in FIG. 4, the drug anomaly detection device 110 holds e.g., the control circuit 114 that includes the controller 115, the 4-module relay 340, and power supplies 320. At least one embodiment of the drug anomaly detection system described, recited, and even contemplated herein may include a drug receptacle 118 placed on a bottom surface within the enclosure 111 (e.g., a box) of the drug anomaly detection device 110. A subject drug may be placed on the drug receptacle 118. In at least one example embodiment, the drug receptacle 118 may include a mark on a bottom or platform surface, indicating the location on which the drug, or even a sampling of the drug, is to be placed within the enclosure 110. In at least one example embodiment, the distance between the drug receptacle 118 and the camera 113 may be predetermined, and/or the distance between the drug receptacle 118 and the light sources 112 may be predetermined, so that the camera may take the pictures of the drug from the same angle, from the same distance (from the drug), and under the same condition (e.g., the same distance between the light sources and the drug).

Spectrometer 117 may include a Near Infrared (wavelength from 750 nm to 2500 nm) light source to capture reflected light. The reflection patterns can indicate drug anomaly.

The light sources 112 activated by e.g., user command sent from the hand-held device 120 in FIG. 2 to the controller 115 via the communication port 116, may include, at least, UV light source 112A, IR light source 1123, and visible light sources 112C.

In operation, the door of the enclosure may be opened, and a subject drug (e.g., a pill), or sampling thereof, may be placed on the drug receptacle 118. The door then may be closed. A user command, entered via GUI and transmitted from the hand-held device 120 via the communication port 116 or start button on device 110 may be engaged to activate the controller 115 (e.g., ASIC) of the control circuit 114. The ASIC 115 may then control each of the light sources 112 to emit light through the control of the relay 340 and the power supply 320.

Each of the light sources 112 may be activated to emit corresponding light (UV, VIS, IR, and/or NIR) in a predetermined order e.g., corresponding to the increasing wavelength or decreasing wavelength of the light fora predetermined period of time, although such implementation is non-limiting. Regardless of the order by which light sources 112 are activated, each of the light sources 112 respectively emits light, the ASIC 115 may activate the camera 113 to capture a predetermined number of images of the subject drug when illuminated by each respective light; alternatively, a spectrometer 117, may capture digital signals reflected from the subject drug that has been subjected to NIR. The captured digital signals, which include either of digital images or digital reflective signals, of the subject drug may be sent to the controller 115 by the camera 113 so as to be accessible by the hand-held device 120, and displayed on the GUI 121 in FIG. 2. Alternatively, the hand-held device 120 may receive an audio or haptic notification of the results of the determination. The controller 115 may send the images along with other information to the hand-held device 120 in FIG. 2 via the communication port 116. Such information includes e.g., processes (such as augmentation process, imprint process, etc.) of each of the captured images, comparison of each of the images (or imprint image or augmented images) with corresponding authentic drug images in the machine learning model run locally by the controller 115, etc.

The captured images and/or signals may also be used as input for subsequent drug anomaly detection machine learning model training and detection process using e.g., CNN and/or an one-class classification.

Figure 5:
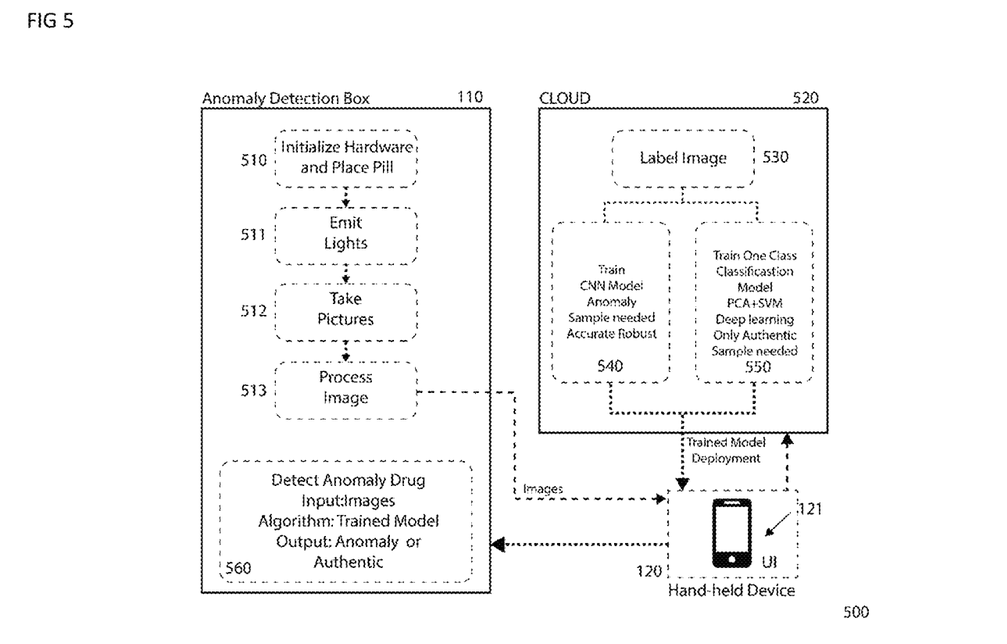
FIG. 5 shows a processing flow for anomaly drug detection, according to at least one example embodiment described and recited herein.

FIG. 5 is a machine learning model training process, according to at least some example embodiments described and recited herein.

The whole process starts from Block 510. Blocks 510, 511, 512, 513 may refer to initializing the hardware and placing the pill, emit the lights, take pictures, and process at least one image (e.g., drug images) and/or a sampling of digital signals corresponding to the subject drug by e.g., the controller 115, as described in further detail in blocks 810, 820, 830, 840, 825, 835, 845, and 850 of FIG. 8. The captured image and/or digital signals are then subjected to machine learning model training at Block 520. In accordance with some embodiments described and recited herein, the training process is implemented before the model is used for drug anomaly detection.

Block 520 may refer to cloud-based machine learning model training operations, e.g., performed in the cloud 140 of FIG. 2. It may include one or more operations, actions, or functions depicted by one or more Blocks 530, 540, 550. Although illustrated as discrete blocks, various blocks may be divided into additional blocks, combined into fewer blocks, or eliminated, depending on the desired implementation. It will be appreciated that for Block 520, the drug anomaly detection system 200 may include an interface (e.g., a web-user-interface) to manage the training process and include a data repository to store the trained models and the retrained models.

Block 530 (Label Image) may refer to labeling the data (e.g., the captured drug images and/or signals corresponding to sample drugs having one or more anomalies collected from Block 510 or from other sources), by e.g., the controller 115. Image imprinting and/or image augmenting, including cropping, may be applied to the collected drug image data before labeling. In at least one example embodiment, labeling may refer to associating a name of a (e.g., authentic or anomaly) drug with the (standard or with one or more anomalies) drug images and/or associating a reference number with each drug image. The labeled data may be used as training data to Block 540 and/or Block 550.

Block 540 (Train CNN Model) may refer to training the neural network model (e.g., Convolutional Neural Network, or CNN) with the labeled data. In the neural network model, both anomalous sample (e.g., an image or sampling of digital images of a subject drug with one or more anomalies) and authentic sample (e.g., authentic drug sampling) may be needed. A whole data set including the anomaly drug images and the authentic drug images may be labeled accordingly, to inform the neural network to consider that some images are authentic drug samplings and some image are drug samplings with one or more anomalies.

Block 550 (Train One Class Classification) may refer to training the one class classification model (e.g., with principal component analysis, or PCA, an unsupervised, non-parametric statistical technique primarily used for dimensionality reduction in machine learning, and Support Vector Machine, or SVM, and/or other deep learning, with the labeled data. The neural network model such as CNN described in the previous section may be more accurate and robust than the one class classification, but it requires both anomalous sample and authentic sample, while the one class classification only need authentic drug sample. In the case that anomalous sample is not obtained in the training phase, the one class classification can be first trained and deployed. The process flow to determine whether neural network model or one class classification model should be used is described in detail in FIG. 6. Training the one class classification model is described in FIG. 7.

In various embodiments described and recited herein, either or both of the trained models from Block 540 and/or Block 550 may be deployed to the controller 115, e.g., via the hand-held device 120, to execute the operation corresponding to Block 560.

Figure 8:
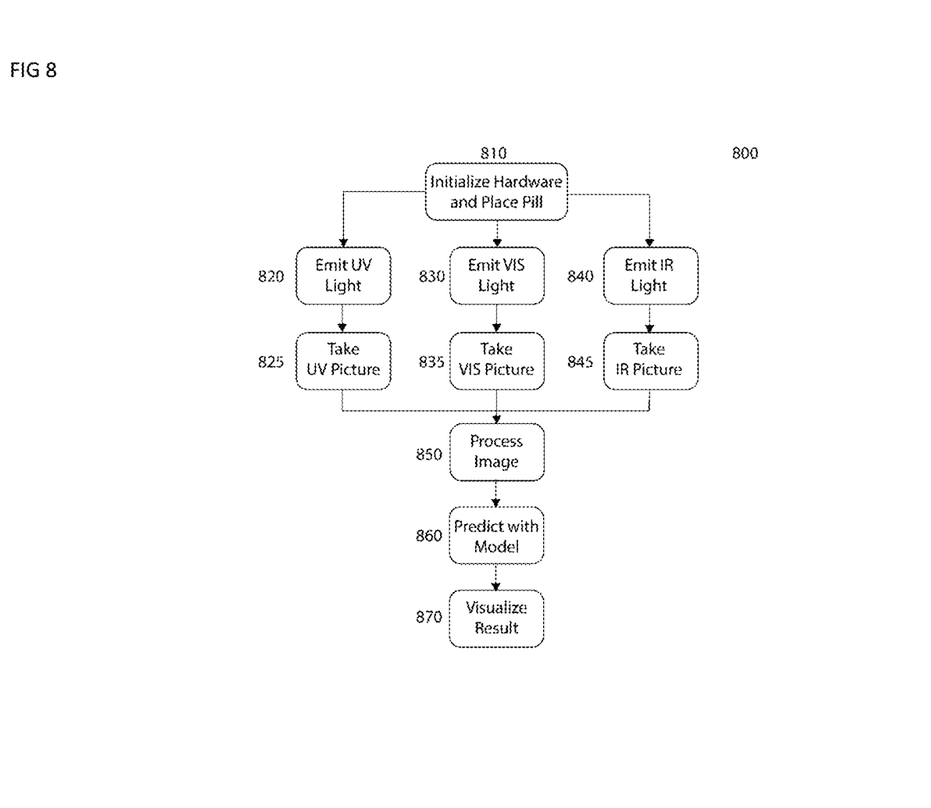
FIG. 8 illustrated a workflow diagram for a machine learning anomaly drug detection system, according to at least one example embodiment described and recited herein.

Block 560 (Detect Drug Anomaly) may refer to detecting drug anomalies (with input: captured drug images, algorithm: trained model (e.g., CNN model and/or one class classification model), output: indication of "Anomaly" or "Authentic"), by e.g., the controller 115, as described with regard to FIG. 8.

Figure 6:
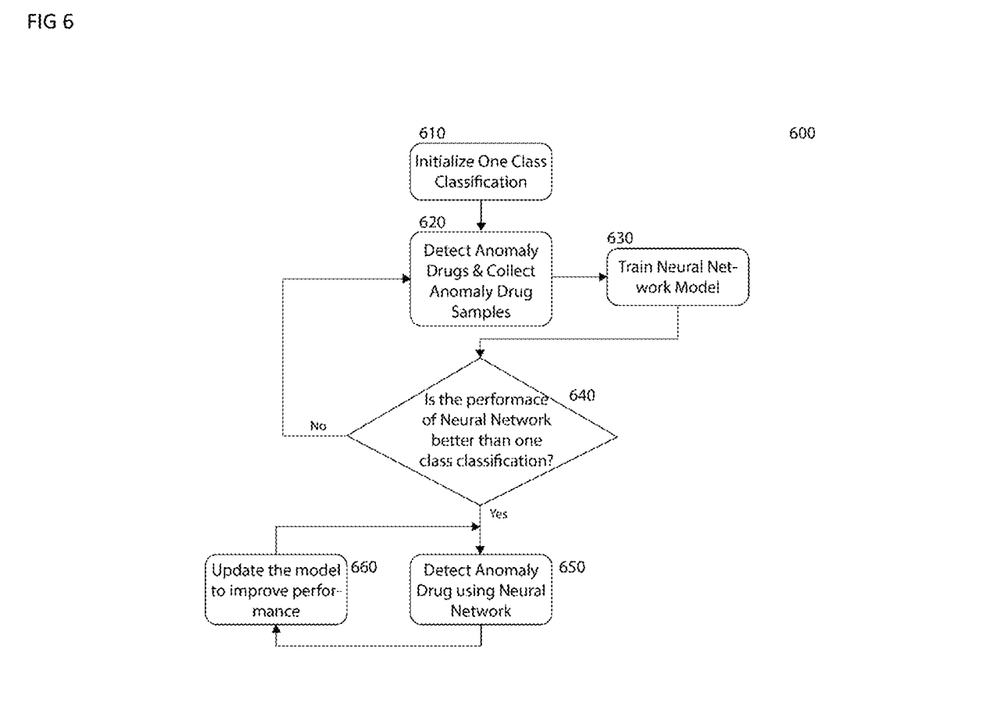
FIG. 6 shows a processing flow for a two-model combined machine learning, according to at least one example embodiment described and recited herein.

FIG. 6 shows a processing flow 600 for a two-model (CNN and the one-class classification) combined architecture, according to at least some example embodiment described herein.

The processing flow 600 may include one or more operations, actions, or functions depicted by one or more blocks 610, 620, 630, 640, 650 and 660. Although illustrated as discrete blocks, various blocks may be divided into additional blocks, combined into fewer blocks, or eliminated, depending on the desired implementation. As a non-limiting example, the description of processing flow 600, corresponding to the depiction thereof in FIG. 6 and performed by e.g., the controller 115 (and/or other controller(s)) in one or more embodiments described herein, pertains to a software system architecture diagram for a two-model (CNN and the one-class classification) combined architecture. Processing may begin at Block 610.

Figure 7:
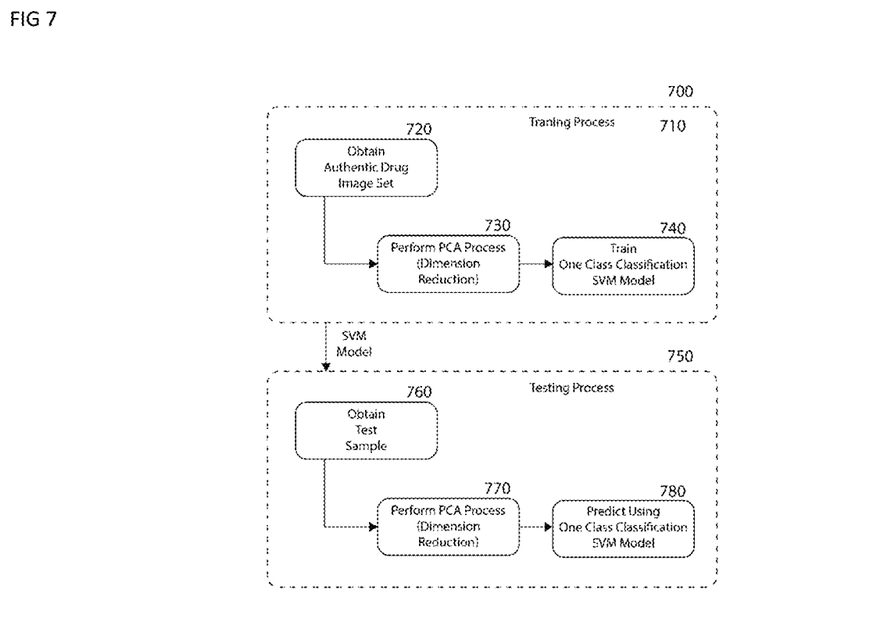
FIG. 7 is a processing flow executed by an anomaly drug detection system, according to at least one example embodiment described and recited herein.

Block 610 may refer to a controller initializing and/or deploying a one-class classification, which is described further with regard to FIG. 7. One class classification, also known as unary classification or class modellings directed to identifying objects of a specific class amongst all objects, by primarily learning from a training set containing only the objects of that class. However, there exist variants of one-class classifiers in which counter-examples are used to further refine the classification boundary. In addition, an anomaly drug sample is not needed to initialize the one class classification. Block 610 may be followed by Block 620.

Block 620 may refer to the controller detecting anomalies in a subject drug and collecting samples of drugs having one or more anomalies (e.g., sample images of the counterfeit drug, etc.). Block 620 may be followed by Block 630.

Block 630 may refer to the controller training a neural network model (e.g., a CNN model) using the collected anomalous drug samples. Block 630 may be followed by Block 640.

Block 640 may refer to the controller comparing the trained neural network model with the initialized one class classification. When the performance of the trained neural network model is better than the one class classification, Block 640 may be followed by Block 650. When the performance of the trained neural network model is not better than the one class classification. Block 640 may be reverted back to Block 620.

Block 650 may refer to the controller implementing neural network drug anomaly detection or drug anomaly detection using the trained neural network model. Block 650 may be followed by Block 660.

Block 660 may refer to the controller updating/retraining the trained neural network model to improve performance of the model. Block 660 may be followed by Block 650.

As set forth above, a sample drug having one or more anomalies is not needed to initialize the (one class classification) of the drug anomaly detection system 200 due to the implementation of a CNN and one-class classification combined system architecture. Instead, authentic drug samples may be sufficient to train the one-class classification model and enact deployment. After deployment and at least some samples of drugs having one or more anomalies are detected, the neural network model may be trained. Because the neural network is more robust and has a better detection rate than the one-class classification, its performance will gradually surpass that of the one class classification. Accordingly, the detection methodology transitions to the neural network model.

One class classification may be implemented by any of multiple candidate algorithms, including SVM (support-vector machine or support-vector network that is supervised learning models with associated learning algorithms that analyze data used for classification and regression analysis), Gaussian density method, Parzen density function and K-center algorithms. As a non-limiting example, the workflow of SVM classification is shown in FIG. 7. For SVM training process, a sample of images of authentic pills or drugs may be collected as a training set.

FIG. 7 is a one class SVM processing flow 700 of the drug anomaly detection system 200, according to at least some example embodiment described and recited herein.

The processing flow 700 may include one or more operations, actions, or functions depicted by one or more blocks 710, 720, 730, 740, 750, 760, 770, and 780. Although illustrated as discrete blocks, various blocks may be divided into additional blocks, combined into fewer blocks, or eliminated, depending on the desired implementation. As a non-limiting example, the description of processing flow 700, corresponding to the depiction thereof in FIG. 7 and performed by e.g., the controller 115 (and/or other controller(s)) in one or more embodiments described herein, pertains to an one class (classification) SVM processing flow of the counterfeit drug detection system 200. Processing flow 700 may begin in Block 710, although alternative embodiments may initiate processing in Block 750.

Block 710 may refer to the training process of the one class classification model, by e.g., the controller of the cloud 140 or the controller of the IT subsystem 130. Block 710 may include Block 720, Block 730 and Block 740.

Block 720 (Obtain Authentic Drug Image Set) may refer to the cloud machine learning training operation Block 520, described with regard to FIG. 5, obtaining a standard drug image and/or digital signal set (data set) and/or image imprinting and/or image augmentation. Block 720 may be followed by Block 730.

Block 730 (Perform PCA Processing) may refer to the cloud machine learning training operation Block 520, described with regard to FIG. 5, reducing the number of random variables under consideration by obtaining a set of principal variables by e.g., feature selecting and feature extracting. Block 730 may be followed by Block 740.

Block 740 (Train One Class SVM Model) may refer to the cloud machine learning training operation Block 520, described with regard to FIG. 5, training one class SVM model with the data set from Block 720 and with dimension reduction on the data set in Block 730. In accordance with at least one non-limiting example embodiment, Block 730 may be followed by processing at Block 750 (trained one class SVM model being deployed to e.g., the controller 115).

Block 750 may refer to the testing process with the trained SVM model from Block 710, by e.g., the controller 115 in FIG. 2. Block 750 includes Block 760, Block 770 and Block 780.

Block 760 (Obtain Test Sample) may refer to the controller 115 obtaining test sample (e.g., obtaining captured drug images or data set for the subject drug being tested/detected) and/or image imprinting and/or image augmentation. Block 760 may be followed by Block 770.

Block 770 (Perform PCA Process) may refer to the controller 115 reducing the number of random variables under consideration by obtaining a set of principal variables by e.g., feature selecting and feature extracting. Block 770 may be followed by Block 780.

Block 780 (Predicting One Class SVM Model) may refer to the controller 115 predicting using the one class SVM model, or detecting counterfeit drug using one class SVM model with the data set from Block 760 and with dimension reduction on the data set in Block 770.

After the machine learning models are trained and deployed into Controller 115 in FIG. 2, a non-limiting example implementation of a drug anomaly detection process may start.

FIG. 8 illustrates a drug anomaly detection diagram 800 for the anomaly drug detection system 200, according to at least some example embodiments described and recited herein. Some components in FIG. 8 correspond to components in FIG. 5. 510 in FIG. 5 corresponds to 810. 511 in FIG. 5 corresponds to 820, 830, and 840. 512 in FIG. 5 correspond to 825, 835, and 845. 513 in FIG. 5 correspond to 850.

Workflow diagram 800 may include one or more operations, actions, or functions depicted by one or more blocks 810, 820, 825, 830, 835, 840, 845, 850, 860, 870, and 880. Although illustrated as discrete blocks, various blocks may be divided into additional blocks, combined into fewer blocks, or eliminated, depending on the desired implementation. As a non-limiting example, the description of workflow diagram 800, corresponding to the depiction thereof in FIG. 8 and performed by e.g., the controller 115 in FIG. 2, pertains to predicting/detecting a drug anomaly using machine learning models trained from the cloud-based training operation. Workflow 800 may begin at Block 810.

Block 810 (Initialize) may refer to initializing the drug anomaly detection device 110 described with regard to FIG. 2 and process thereof. A subject drug (e.g., a pill), or sampling thereof, may be placed on or in the drug receptacle 118 of device 110, via the enclosure 111 in FIG. 2. After the door is closed, the controller 115 may activate components (e.g., memory of the control circuit 114, the detector 113, etc.) of the drug anomaly detection device 110 by a user command from the hand-held device 120 or via an activation feature, e.g., UI, on the device 110. Block 810 may be followed by any or all of Block 820, Block 830, and Block 840 that control the emit of light sources.

Block 820 may refer to the light source 112A, described previously with reference to FIG. 2, emitting the UV light to expose the drug, or sampling thereof, to the emitted UV light, and/or the controller 115 activating the light source 112A (by controlling the corresponding power supply 320 via the relay 340) to emit the UV light to expose the drug, or sampling thereof, to the emitted UV light. Block 820 may be followed by Block 825. In one or more embodiments, operations corresponding to Block 820 and Block 825 may be performed simultaneously or substantially so.

Block 830 may refer to the light source 112C, described previously with reference to FIG. 2, emitting the visible (VIS) light to expose the drug, or sampling thereof, to the emitted VIS light, and/or the controller 115 activating the light source 112C, by controlling the corresponding power supply 320 via the relay 340, to emit the VIS light to expose the drug to the emitted VIS light. Block 830 may be followed by Block 835. In one or more embodiments, operations corresponding to Block 830 and Block 835 may be performed simultaneously.

Block 840 may refer to the light source 112B, described previously with reference to FIG. 2, emitting at least one of an NIR or IR light to expose the drug, or sampling thereof, to the emitted IR light, and/or the controller 115 activating the light source 112B (by controlling the corresponding power supply 320 via the relay 340) to emit the NIR or IR light to expose the drug to the emitted IR light. Block 840 may be followed by Block 845. It will be appreciated that operations corresponding to Block 840 and Block 845 may be performed simultaneously.

Operations corresponding to Block 820, Block 830, or Block 840 may be performed, e.g., in an order corresponding to the increasing/decreasing frequency/wavelength of the light emitted by the light sources 112A, 112B, or 112C, although such order is not limiting to the embodiments described and recited herein. The controller 115 may control the sequence of Block 820, Block 830, and Block 840.

Block 825, Block 835, or Block 845 may refer to the detector 113, described previously with reference to FIG. 2, in the form of a camera, capturing images (taking pictures/photos) of the drug, or sampling thereof, on receptacle 118 when each of the corresponding light sources 112 emits light. In at least one alternative embodiment, detector 117, in the form of a spectrometer, may capture digital signals reflecting from the subject drug exposed to NIR.

Block 825 may refer to the detector 113, described previously with reference to FIG. 2, capturing a predetermined number of digital images of the drug under the ultraviolet (UV) light emitted by the UV light source 112A. The controller 115 may control the camera to capture images of the drug and/or control the corresponding power supply 320 via the relay 340, to activate the UV light source 112A to emit UV light for a predetermined period of time.

Block 835 may refer to the detector 113, described previously with reference to FIG. 2, capturing a predetermined number of images of the drug under the visible light emitted by the VIS light source 112C. The controller 115 may control the camera to capture images of the drug and/or control the corresponding power supply 320 via the relay 340, to activate the VIS light source 112C to emit visible light for a predetermined period of time.

Block 845 may refer to the detector 113, described previously with reference to FIG. 2, in the form of a camera, capturing a predetermined number of images of the subject drug under the infrared (IR) light emitted by the IR light source 112B. The controller 115 may control the camera to capture digital images of the subject drug and/or control the corresponding power supply 320 via the relay 340, to activate the IR light source 112B to emit IR light for a predetermined period of time.

Operations corresponding to Block 825, Block 835, or Block 845 may be performed, e.g., in an order corresponding to the increasing/decreasing frequency/wavelength of the light emitted by the light sources 112A, 112B, or 112C, although such order is not limiting to the embodiments described and recited herein. The controller 115 may control the sequence of Block 825, Block 835, and Block 845. Block 825, Block 835, or Block 845 may be followed by Block 850.

Block 850 may refer to controller 115, described previously with reference to FIG. 2, executing image processing (e.g., digital image processing) of the captured images of the subject drug, including imprinting image(s), augmenting image(s), etc. Under different wavelengths of light (UV, VIS, IR), each of the captured images may have a specific imprint. Imprinting images(s) may capture the texture of the drug from the respective images and/or the layout for the imprint of the respective images and remove image effects such as colors, etc. that are not relevant to the texture of the drug.

In accordance with at least one alternative embodiment, Block 850 may refer to controller executing signal processing of the captured digital signals of the subject drug.

Block 860 may refer to controller 115, described previously with reference to FIG. 2, executing a prediction model or determining that the subject drug is anomalous or not legitimate using, e.g., trained machine-learning model(s) relative to the captured images of the subject drug. The algorithm or the software system for detecting may be disclosed in detail in FIG. 5. Block 860 may be followed by Block 570.

Block 570 may refer to controller 115, described previously with reference to FIG. 2, implementing result notification/displaying. The controller 115 may send at least the captured images of the subject drug, individually or along with other information to the hand-held device 120 in FIG. 2 via the communication port 116, or to other suitable system (e.g., the IT sub-system 130, the cloud 140, etc. via the hub 150 described with reference to FIG. 1). Such information includes e.g., imprinted image of each of the captured drug images, corresponding authentic drug images in the machine learning model, etc.

Figure 9:
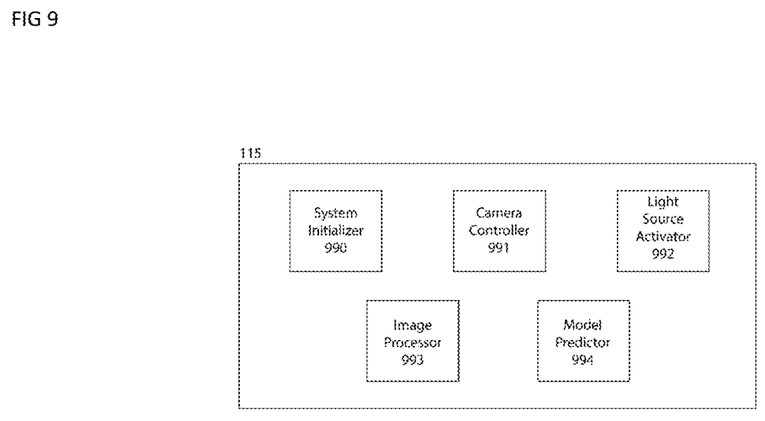
FIG. 9 shows a block diagram of a controller for an anomaly drug detection system, according to at least one example embodiment described and recited herein.

FIG. 9 shows a block diagram representing a controller 115, described previously with reference to FIG. 2, for a drug anomaly detection device 200, according to at least one example embodiment described and recited herein. As depicted, controller 115 includes at least a system initializer 990, a detector controller 991, a light source activator 992, an image processor 993, and a model predictor 994. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

The system initializer 990 may refer to a component that is designed, programmed, or configured to initialize the drug anomaly detection device 200.

The detector controller 991 may refer to a component that is designed, programmed, or configured to control the detector 113 to capture images of the drug e.g., placed on the drug receptacle 118.

The light source activator 992 may refer to a component that is designed, programmed, or configured to activate the light sources 112 in FIG. 2 so that the detector 113 may capture digital images and/or digital signals of the drug under the light emitted by the light sources 112.

The image processor 993 may refer to a component that is designed, programmed, or configured to process images captured by the detector 113.

The model predictor 994 may refer to a component that is designed, programmed, or configured to detect one or more anomalies corresponding to the subject drug by using the trained model.

Figure 10A:
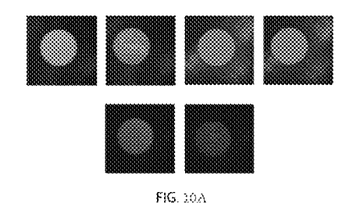
FIGS. 10A, 10B and 10C show non-limiting example images of drugs that may be processed and/or analyzed by at least some example embodiments described and recited herein.
Figure 10B:
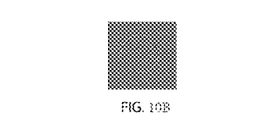
Figure 10C:
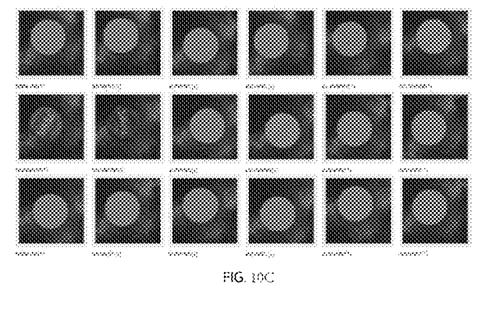

FIGS. 10A, 10B and 10C show various drug images, according to at least some example embodiment described and recited herein. FIG. 10A shows sample images under different light spectrum, including anomalous drug images or digital signals under UV light, standard drug image or digital signals under UV light, anomalous drug images or digital signals under VIS light, standard drug image or digital signals under VIS light, anomalous drug images or digital signals under NIR or IR light, and standard drug image or digital signals under NIR or IR light. FIG. 10B shows a Laplacian Gradient processing (e.g., image imprinting) of an example drug image. FIG. 10C shows part of image library that include processed drug images from the original drug image.

Raw images of a particular pill, drug, or sampling thereof, may be collected and processed to improve detection of counterfeit drugs. First, images of a respective pill may be cropped to eliminate the dark background. To crop the image, which entails rendering a complete image of a subject pill, a crop position and area of cropping may be defined. In the interior of the counterfeit drug detection device 110, e.g., the enclosure 111, a small dot on the drug receptacle 118 may be provided directly below the detector 113. When taking an image of the pill, the pill is to cover the small dot to ensure that pill is at the center of the images. Then the area of the cropped image may be refined to ensure the pill area.

To better classify imprint and shape of the pills, the Laplacian Gradient Algorithm may be used to crop images, as shown in FIG. 10B, to purify the image with only imprint and shape reserved, which could improve model performance.

A large amount of training samples of authentic and/or anomalous drugs, e.g., pills may be utilized. However, rather than collecting and using thousands of images of a particular pill, an image augmentation algorithm may be implemented to automatically generate images of varying scale, positions, etc. Accordingly, the model may be more robust and more efficiently trained. An open source neural network library may be utilized to auto generate images (image augmentation), as depicted in FIG. 10C. The position of the image may be shifted, the image may be sheared, the brightness changed, the image flipped, etc. The pill position and rotation may vary, although a sheared image may not be zoomed-in and/or zoomed-out because a sheared image may change the shape of the pill, which itself is an important feature in anomaly detection. Because the position of the camera may be fixed, there may be no zoom in/out variant in testing. If the size of the pill changes, the pill may be classified as anomalous. Therefore, in training, the size of the pill should remain the same.

Processed and duplicated (augmented) images may be uploaded to the machine learning platform for training; and a trained model may be deployed to the control circuit 114 to be used as a prediction model.

A computation model (e.g., run by the controller 115) may be implemented to better control the light sources 112 (e.g., LEDs), detector(s) 113, 117 and the prediction module (control circuit 114). The computation model may be used to control the whole system. The model includes a command to capture and transmit images and to capture images and detect counterfeits. It will return the detection result together with the images. Different drugs or types of drugs have corresponding training models; thus the name of drug may be utilized for anomaly detection. A user interface 121, described previously with reference to FIG. 2, may be developed on mobile platform 120, and a control circuit 114 may be connected to a user's smartphone 120 via Bluetooth 116. An example of the user interface is shown in FIG. 11A and FIG. 11B.

Figure 11A:
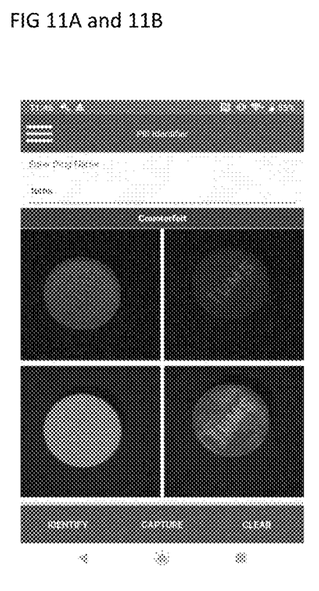
FIG. 11A and FIG. 11B show non-limiting examples of user interfaces of a counterfeit drug detection system, according to at least some example embodiments described and recited herein.
Figure 11B:
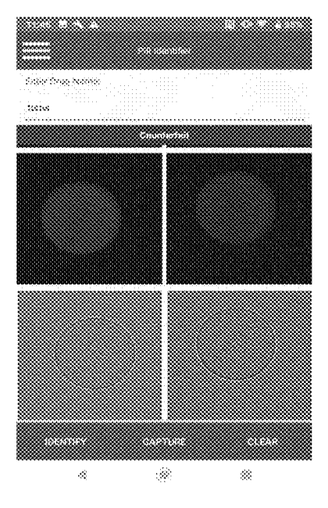

FIGS. 11A and 11B show, respectively user interfaces of detected/captured drug image under UV light and an authentic drug image under UV light; detected/captured drug image under VIS light and authentic drug image under VIS light; detected/captured drug image under IR light and authentic drug image under IR light; detected/captured imprint drug image and authentic imprint drug image; and the result (indication of "Counterfeit" in this example). In FIGS. 11A and 11B, the detected/captured drug images may be on the right-hand side of the GUI, and the authentic drug images are on the left-hand side of the GUI. It will be appreciated that the arrangement, location, and size of the images may be any suitable arrangement, location, and size. That is, the configurations shown and described herein are non-limiting examples.

In FIGS. 11A and 11B, the respective UIs include data fields such as, but not limited to, "Enter Drug Name," e.g., at a top portion of the GUI, for a user to enter the name of a drug. The name may be associated with the labeling of the data set, e.g., images of an authentic drug, which may be used to train the machine learning model(s). The drug to be detected is to be verified/detected against or using the trained model with the labeling.

There may also be a button/link "IDENTIFY," or the like, to begin processing regarding the drug on the drug receptacle of the device 110 in FIG. 2 to determine whether the drug is legitimate or counterfeit.

There may also be a button/link "CAPTURE," or the like, to have the camera capture and display images/pictures of the drug on the drug receptacle.

There may also be a button/link "CLEAR," or the like, to clear the display on the GUI.

The name of the drug, the "IDENTIFY" and/or "CAPTURE" button-click (or link-click) may be sent from the hand-held device 120 in FIG. 2 to the controller 115 of the control circuit 114 via the communication port 116, e.g., Bluetooth, etc., as user command to control the controller to start/trigger a capturing and/or detecting process described above.

Embodiments disclosed herein provide controlled environment for better accuracy. The detection device is an integrated box that provides a controlled environment and therefore eliminates any environmental impact on the detection result. With the controlled environment, the temperature variance may be minimal, the camera may take the picture from the same angle, from the same distance (from the drug), under the same condition (e.g., the same distance between the light sources and the drug). Embodiments disclosed herein also provide machine learning based recognition for standardization and increased productivity. Because the detection device provides image cognition capability, it may be standardized to reduce training time and human errors. Embodiments disclosed herein further provide updatable, anomaly detection rules for continuous improvement. For each new image, whether a new authentic pill or an anomalous, the image cognition system is automatically updated by cloud-based services. Consequently, the trained machine-learning model may be reusable and further improved for increased accuracy. In addition, embodiments disclosed and recited herein may provide offline capability for better flexibility. The flexibility of the detecting system is such that the detecting device may connect to internet, but the detecting device may also be operated in an environment without an internet connection or even without utility/shore power. Embodiments disclosed herein also provide system integration and reporting capabilities via e.g., a console web application. Embodiments disclosed herein further provide modular design for better enhancement support. Continuous enhancement may be possible because of the modularized approach. The hardware configuration may be changed quickly as business needs shift without affecting operation. For example, a larger box/enclosure/device may be employed to scan outer packaging of drug(s) to detect a drug inside the packaging using e.g., near-IR light source, without damaging the package/seal of the drug.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

The herein described subject matter sometimes illustrates different components contained within, or connected with, different other components. It is to be understood that such depicted architectures are merely examples and, in fact, many other architectures may be implemented to achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting.

We claim:

1. A portable drug anomaly detection device, comprising:
a receptacle;
at least one light source to emit light of a predetermined wavelength;
a detector to capture multiple digital signals at different predetermined wavelegnths corresponding to a drug in the drug receptacle; and
a control circuit that is configured to:
process the captured multiple digital signals in accordance with a trained machine-learning model, wherein the trained machine-learning model is trained on digital signals from at least an anomalous sample and an authentic drug sample, and
identify an anomaly corresponding to the object in the receptable based on at least the captured multiple digital signals, in accordance with the trained machine-learning model, wherein the receptacle, the at least one light source, the detector, and the control circuit are configured within the device.

2. The device according to claim 1, wherein the at least one light source is at least one of an ultraviolet light source, an infrared light source, or a visible light source.

3. The device according to claim 1, wherein the detector is a camera.

4. The device according to claim 3, wherein the camera is configured to capture an image of the drug in the drug receptacle as the drug is subjected to one of an ultraviolet light, an infrared light, or a visible light.

5. The device according to claim 1, wherein the detector is a spectrometer.

6. The device according to claim 5, wherein the spectrometer is a NIR spectrometer.

7. The device according to claim 1, wherein the control circuit is configured to execute the trained anomaly detecting machine learning model locally within the device.

8. The device according to claim 1, wherein the control circuit includes at least one communication port that is configured to:
receive the trained anomaly detecting machine learning model, and
transmit an alert upon identification of the anomaly.

9. The device according to claim 1, wherein the trained learning model includes an augmented image of a standardized version of the drug.

10. A non-transitory computer-readable medium having stored thereon executable instructions that, when executed by a processor, cause the processor to perform operations to identify an anomaly corresponding to a drug, the operations comprising:
exposing at least a sampling of the drug to a light emitted from at least one light source;
capturing multiple digital signals at different predetermined wavelengths corresponding to the sampling of the drug when exposed to the light emitted from the at least one light source;
applying a machine-learned model to the captured multiple digital signals of the sampling of the drug, wherein the machine-learning model is trained on digital signals from at least an anomalous sanple and an authentic drug sample; and
determining whether the captured multiple digital signals includes an indication of anomaly relative to a standard for the drug based on the machine-learned model applied to the captured digital image.

11. The computer-readable medium of claim 10, wherein the computer-readable medium is stored within a portable device that comprises a drug receptacle, the at least one light source, a detector, and a processor to execute the machine-learned model.

12. The computer-readable medium according to claim 11, wherein the at least one light source is at least one of an ultraviolet light source, an infrared light source, or a visible light source.

13. The computer-readable medium according to claim 11, wherein the detector is a camera.

14. The computer-readable medium according to claim 13, wherein the camera is configured to capture an image of the drug in the drug receptacle as the drug is exposed to one of an ultraviolet light, an infrared light, or a visible light.

15. The computer-readable medium according to claim 11, wherein the detector is a spectrometer.

16. The computer-readable medium according to claim 15, wherein when the spectrometer is a NIR spectrometer.

17. The computer-readable medium according to claim 11, wherein the portable device includes at least one communication port that is configured to:
receive the machine-learned model, and
transmit an indicator of a result of the determining.

18. The computer-readable medium according to claim 16, wherein the portable device is in Bluetooth communication with a portable computing device.

19. The computer-readable medium according to claim 10, wherein the anomaly is indicative of a counterfeit drug.

20. A system, comprising:
a drug verification device, comprising:
a sampling holder;
a light source to emit light of a predetermined wavelength;
a detector to capture multiple digital signals at different predetermined wavelengths corresponding to a drug sampling in the sampling holder;
a control circuit that is configured to identify an anomaly corresponding to the drug sampling based on at least the captured multiple signals in the sampling holder, in accordance with a trained machine-learning model, wherein the trained machine-learning model is trained on digital signals from at least an anomalous sample and an authentic drug sample; and
a portable device, communicatively connected to the drug verification device via a near-field communication protocol, configured to:
transmit the trained machine-learning model to the drug verification device, and
receive an indicator that an anomaly has been detected in connection with the drug sampling in the sampling holder.

* * * * *